United States Patent [19]

van Rosmalen

[11] Patent Number: 5,171,984
[45] Date of Patent: Dec. 15, 1992

[54] SCANNING DEVICE COMPRISING A ROTATABLE MIRROR, DRIVE UNIT FOR USE IN THE SCANNING DEVICE, USING PERMANENT MAGNETIC ROTOR BODY AND STATIONARY STATOR SECTION

[75] Inventor: Gerard E. van Rosmalen, Eindhoven, Netherlands

[73] Assignee: U.S. Philips Corporation, New York, N.Y.

[21] Appl. No.: 644,721

[22] Filed: Jan. 23, 1991

[30] Foreign Application Priority Data

Jun. 1, 1990 [NL] Netherlands ............ 9001260

[51] Int. Cl.⁵ .............................. H01J 3/14
[52] U.S. Cl. .................... 250/236; 318/640
[58] Field of Search ............. 250/234–236; 359/216–219; 318/132, 135, 254, 640

[56] References Cited

U.S. PATENT DOCUMENTS

| | | | |
|---|---|---|---|
| 3,575,650 | 4/1971 | Fengler | 318/135 |
| 3,739,247 | 6/1973 | Yamaguchi et al. | 318/640 |
| 3,959,673 | 5/1976 | Montagu | 359/214 |
| 4,135,119 | 1/1979 | Brosens | 318/128 |
| 4,142,144 | 2/1979 | Rohr | 318/662 |
| 4,540,927 | 9/1985 | Tanimoto | 318/696 |
| 4,731,657 | 3/1988 | Miyagi | 318/318 |
| 4,803,408 | 2/1989 | Uhde et al. | 318/254 |
| 4,856,858 | 8/1989 | Koike et al. | 359/213 |
| 5,066,897 | 11/1991 | Ueda et al. | 310/12 |

Primary Examiner—David C. Nelms
Assistant Examiner—S. Allen
Attorney, Agent, or Firm—David R. Treacy

[57] ABSTRACT

A scanning device comprises a rotatable mirror and a drive unit. The drive unit comprises a rotor section which carries the mirror and which is rotatable about an axis of rotation (19), which rotor section has a disc-shaped at least partly permanent-magnetic rotor body (13). The drive unit further comprises a stationary stator section with coils (9) extending in the magnet field of the rotor body to generate electromagnetic driving forces acting on the rotor body to provide the rotary drive of the mirror, and coils (11) disposed in the magnet field of the rotor body to generate electromagnetic bearing forces acting on the rotor body, for electromagnetically supporting the rotatable rotor section relative to the stator section.

20 Claims, 5 Drawing Sheets

SCANNING DEVICE COMPRISING A ROTATABLE MIRROR, DRIVE UNIT FOR USE IN THE SCANNING DEVICE, USING PERMANENT MAGNETIC ROTOR BODY AND STATIONARY STATOR SECTION

BACKGROUND OF THE INVENTION

The invention relates to a scanning device comprising a rotatable mirror for directing and aiming a radiation beam at a surface to be scanned, and a drive unit comprising a rotor section including a cylindrical, in particular disc-shaped, at least partly permanent-magnetic rotor body, carrying the mirror and supported so as to be rotatable about an axis of rotation, and a stationary stator section with coils extending into the magnet field of the rotor body, for generating electromagnetic driving forces acting on the rotor body to provide the rotary drive of the rotor section.

Such a scanning device is known from Japanese Kokai 61-147218. The known scanning device comprises a brushless electric motor having a stator with coreless flat coils. The electric motor has a rotor with two axially magnetized permanent magnets and mirror segments arranged at the circumferential surfaces of the magnets. The prior-art scanning device further comprises a centrally arranged mechanical bearing, in particular an air bearing, to support the rotor for rotation about an axis of rotation. The bearing has gaps between the bearing surfaces in which compressed air is introduced by means of a pumping device.

A drawback of the prior-art scanning device is the presence of the air bearing, in which such a turbulence can develop at high rotor speeds that an unstable bearing condition arises. However, for many uses of scanning devices comprising polygonal mirrors, high speeds and stable bearing arrangements are required.

A further drawback of the known scanning device is that in the course of time contamination in the bearing gives rise to wear of the bearing. Another drawback is that on account of the accuracy requirements imposed on it an air bearing is comparatively difficult to manufacture and is therefore comparatively expensive.

SUMMARY OF THE INVENTION

It is an object of the invention to provide a scanning device of the type defined in the opening paragraph which does not have said drawbacks.

To this end the scanning device in accordance with the invention is characterized in that the stator section of the drive unit comprises coils disposed in the magnet field of the rotor body, for generating electromagnetic bearing forces acting on the rotor body to support the rotatable rotor section electromagnetically relative to the stator section.

As a result of the electromagnetic bearing created in the scanning device in accordance with the invention, the rotor section carrying the mirror freely rotates without mechanical contact in the energized condition of the coils. In the case of a suitable configuration of coils for generating electromagnetic bearing forces and suitable energizing currents through the coils for generating the electromagnetic bearing forces, a stable bearing system with a fixed axis of rotation can be obtained. By energizing the coils for generating electromagnetic bearing forces before the coils for generating electromagnetic driving forces are energized, it is ensured that when the rotor section is set into rotation there is no mechanical contact between the rotor section and the stator section. The electromagnetic bearing formed by the coils for generating electromagnetic bearing forces and the rotor body provides trouble-free operation and is easy to manufacture owing to its simple construction.

The scanning device in accordance with the invention is very suitable for scanning magnetic recording tracks or recording marks on an elongate carrier or tape by means of a radiation beam.

An embodiment of the scanning device in accordance with the invention is characterized in that the scanning device comprises a position and orientation measurement system comprising at least one detector for measuring the position and orientation of the mirror and for generating signals, a matrix circuit being provided for selectively driving the coils for generating electromagnetic bearing forces depending upon said signals.

Said measurement system in conjunction with the matrix circuit enables the coils for generating electromagnetic bearing forces to be driven in such a way that, viewed in a system of orthogonal axes whose origin is situated in the mirror and of which one of the axes, the Z-axis, coincides with the axis of rotation, it is possible to move the axis of rotation of the mirror along the X-axis, the Y-axis and the Z-axis and to tilt said axis of rotation about the x-axis and the y-axis. The remaining movement possibility in accordance with a sixth degree of freedom, namely a rotation about the Z-axis, is obtained by energizing the coils for generating the electromagnetic driving forces.

Depending on specific requirements, the position and orientation measurement system of the scanning device in accordance with the invention may be adapted to measure the position and orientation of the mirror relative to the surface to be scanned, in particular recording tracks or marks, and/or relative to the stator section of the drive arrangement. If the measurement system is adapted to measure the position and the orientation of the mirror relative to the surface to be scanned, possible deviations in the orientation of the surface to be scanned, for example as a result of inaccuracies in the guidance construction of the carrier of the surface to be scanned, can be compensated for automatically by tilting and/or translating the axis of rotation. By constantly measuring the orientation of the rotor section or the mirror relative to the stator section any deviations of the position of the axis of rotation relative to a predetermined axis can be compensated for electronically. A combination of said measurements is also possible. Hereinafter, the position and orientation measurement system is also referred to briefly as the position measurement system.

Said measurement system and said matrix circuit form part of an electronic control circuit of the scanning device. In order to preclude instabilities of the control system it is important to avoid crosstalk within the circuit whenever possible. For this purpose the measurement system preferably comprises a plurality of detectors, which operate independently or substantially independently of one another, for measuring the position and orientation of the mirror and for generating signals. The number of detectors is determined, in principle, by the number of desired correction possibilities with respect to the position and orientation of the axis of rotation and is preferably five.

An embodiment of the scanning device in accordance with the invention is characterized in that the coils for generating electromagnetic bearing forces are segmental coils and are arranged in sets of segmental coils which are juxtaposed viewed in the circumferential direction in the rotor body, the sets of segmental coils each comprising at least two segmental coils which are arranged in line viewed along the axis of rotation of the rotor section.

The stationary segmental coils are spaced at some distance from the rotor body and cooperate magnetically with the rotor body via an air gap. In the case of selective energization of the segmental coils it is possible to produce three forces directed along the three coordinate axes of a system of orthogonal axes and two torques acting about two of said coordinate axes. The segmental coils, which generally have a substantially banana-like arcuate shape, can be manufactured simply and occupy a comparatively small amount of space. The segmental coils can be constructed as coils having one active coil section which is situated opposite the rotor body, which extends in the circumferential direction of the rotor body and which cooperates magnetically with the rotor body, and passive coil sections which are situated substantially farther from the rotor body and which are immaterial in the generation of electromagnetic forces. It is also possible to have segmental coils comprising two parallel active coil sections which extend in the circumferential direction of the rotor body and which viewed along the axis of rotation are disposed in line, which active coil sections are connected by passive coil sections. Moreover, further modifications and combinations of segmental coils are possible. In general, the rotor body will then be axially magnetized at least partly although suitable coil configurations in conjunction with an at least partly radially or otherwise magnetized stator body are possible.

An embodiment of the scanning device in accordance with the invention which is attractive for reasons of symmetry and efficiency is characterized in that the number of sets of segmental coils is at least four.

An embodiment of the scanning device in accordance with the invention in which the rotor section can rotate perfectly freely in space, without requiring the use of additional bearing means such as stator magnets, is characterized in that the rotor section of the drive unit is supported exclusively electromagnetically.

An embodiment of the scanning device in accordance with the invention, in which the rotor body at least partly exhibits a permanent axial magnetization and in which the coils for generating electromagnetic driving forces are disposed in a plane which is oriented transversely of the axis of rotation of the rotor body of the drive unit, is characterized in that the rotor body comprises non-magnetic portions, or magnetic portions having a direction of magnetization opposite to that of the remainder of the rotor body, which portions are situated opposite the coils for generating electromagnetic driving forces, which portions are spaced at a radial distance from the circumferential surface of the rotor body and which portions are tangentially bounded and extend axially in the rotor body.

The rotor body of this scanning device is very suitable for magnetic cooperation with both the coils for generating electromagnetic bearing forces and the coils for generating electromagnetic driving forces. Since the non-magnetic portions or said magnetic portions do not extend up to the circumferential surface of the rotor body the magnetic field is highly uniform in a zone around the circumferential surface of the mechanically strong rotor body. This has the advantage that the coils for generating electromagnetic bearing forces are also disposed in a substantially constant magnet field during rotation of the rotor section, which is beneficial for the bearing characteristics.

A simple to realise embodiment of the scanning device in accordance with the invention is characterized in that the non-magnetic portions are formed by regularly spaced holes which extend axially in the rotor body. Depending on specific requirements the holes may be through-holes or pot-holes and can be formed by means of a suitable drilling tool during manufacture, preferably prior to magnetization of the rotor body.

Another embodiment of the scanning device in accordance with the invention in which the rotor body at least partly exhibits an axial permanent magnetization and in which the coils for generating electromagnetic driving forces are disposed in a plane which is oriented transversely of the axis of rotation of the rotor section of the drive unit, is characterized in that the rotor body comprises non-magnetic portions situated opposite the coils for generating electromagnetic driving forces and adjoining the circumferential surface of the rotor body, which portions are bounded in a tangential direction and extend axially in the rotor body. In this embodiment, in which the rotor body has to be magnetized in only one direction during manufacture, the coils for generating electromagnetic bearing forces are situated in a fluctuating magnet field during rotation of the rotor section. However, the resultant fluctuations can be compensated for easily by electronic means.

In a further embodiment of the scanning device in accordance with the invention, the coils for generating electromagnetic driving forces are disposed in a plane which is oriented transversely of the axis of rotation of the rotor section of the drive unit, and the rotor body comprises first and second magnetic portions having opposite directions of magnetization, which portions are situated opposite the coils for generating electromagnetic driving forces, which adjoin the circumferential surface of the rotor body, which are bounded in the tangential direction and which extend axially in the rotor body. The first magnetic portions together form a first part of the circumferential length of the circumferential surface and the second magnetic portions together form a second part of the circumferential length of the circumferential surface of the rotor body. This embodiment is characterized in that the first part of the circumferential length is unequal to the second part of the circumferential length of the circumferential surface of the rotor body.

In contradistinction to the axially magnetized rotor body known from the Japanese Kokai 61-147218, the rotor body in the last-mentioned embodiment of the scanning device in accordance with the invention has a non-zero average magnetic field strength viewed along the circumferential surface of the rotor body, so that the rotor body in the scanning device in accordance with the invention can cooperate effectively both with the coils for generating electromagnetic driving forces and with the coils for generating electromagnetic bearing forces.

For reasons of production engineering and for reasons of mechnical strength it is preferred to manufacture the rotor body from one piece of a material. This is of particular importance if very high speeds of rotation of the mirror are envisaged.

An embodiment in which the number of coils is to be minimized is characterized in that at least a number of the coils are constructed as combination coils which function both as coils for generating electromagnetic driving forces and as coils for generating electromagnetic bearing forces. The rotor body in this embodiment may be an axially magnetized cylindrical body of elliptical or similar cross-section.

Still another embodiment of the scanning device in accordance with the invention is characterized in that there is provided an evacuated chamber in which at least the mirror and the mirror-carrying rotor section of the drive unit are arranged. This embodiment utilizes the afore-mentioned advantages of the scanning device in accordance with the invention to an optimum extent. Since the rotor section is situated in the evacuated chamber it is possible to attain high accelerations and high speeds of the mirror, in particular a polygonal mirror. The partial vacuum prevailing in the chamber mitigates the production of noise, erosion and pollution of the drive unit. Moreover, the loss of energy in the scanning device comprising the evacuated chamber is very small as a result of the complete absence of mechanical friction and the almost complete absence of air resistance.

The invention also relates to a drive unit for use in the scanning device in accordance with the invention and to a rotor body for use in the drive unit.

The invention will be described in more detail, by way of example, with reference to the drawing.

DESCRIPTION OF THE PREFERRED EMBODIMENTS

Figure 1:
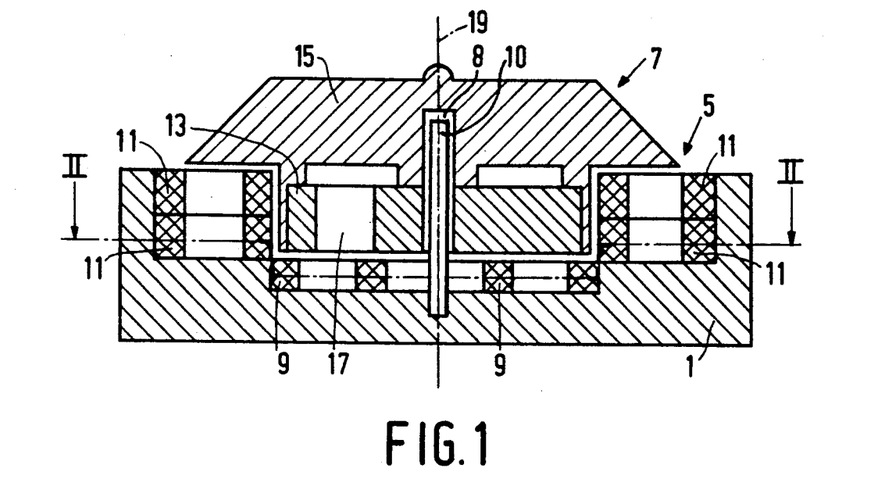
FIG. 1 is a longitudinal sectional view of a part of the scanning device in accordance with the invention comprising a rotatable mirror.
Figure 2:
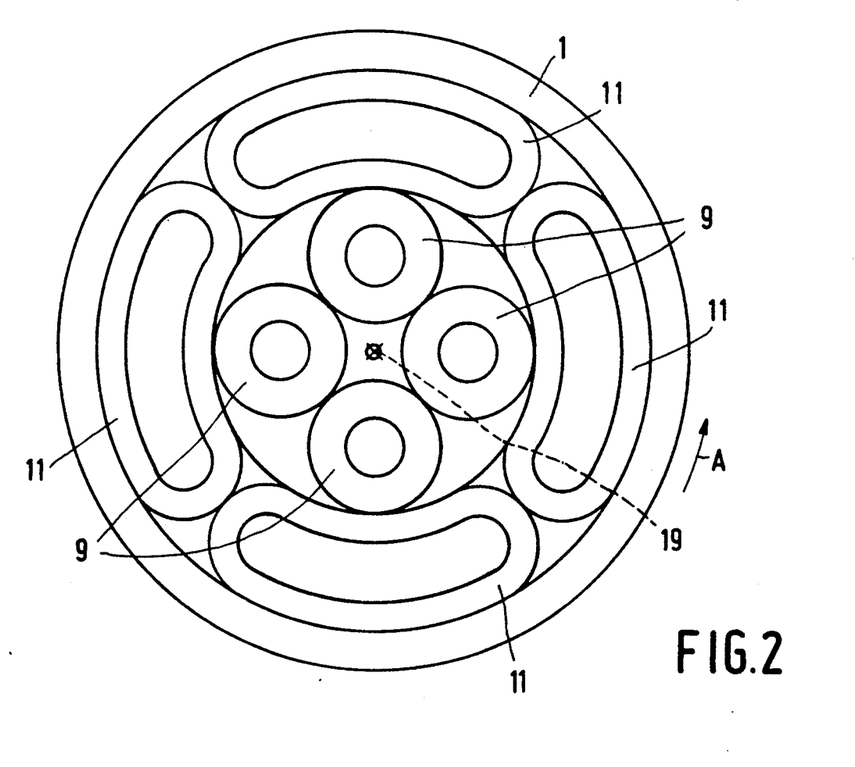
FIG. 2 is a sectional view taken on the line II—II in FIG. 1.
Figure 3:
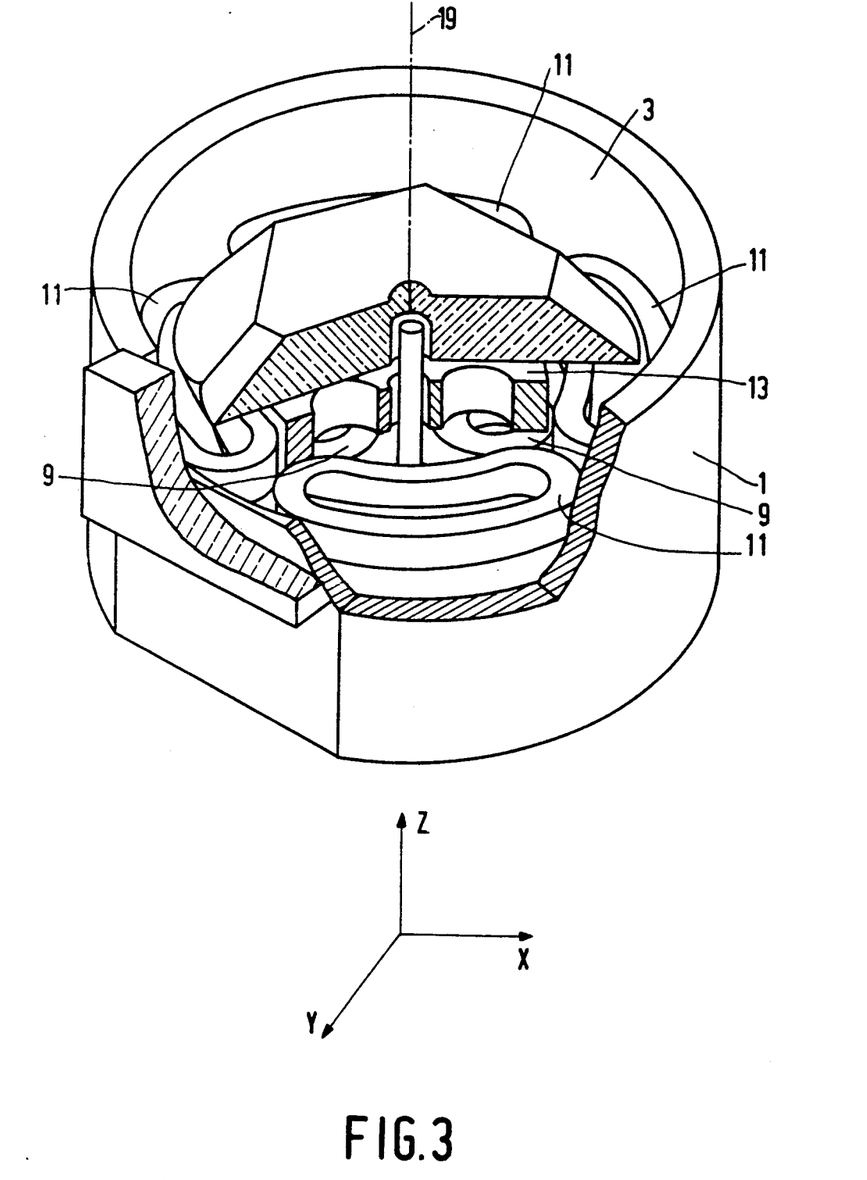
FIG. 3 is a perspective view showing a part of the scanning device and the drive unit therein shown in FIG. 1.

The scanning device in accordance with the invention shown in FIGS. 1, 2 and 3 comprises a housing 1, which forms an enclosed evacuated chamber 3 in which for example a pressure of $10^3$ Pa prevails. The housing accommodates an electrical drive unit comprising a stator section 5 and a rotor section 7. The stator section 5, which is secured to the inner side of the housing 1 or which is integral therewith, comprises two groups of coils bearing the reference numerals 9 and 11 respectively. The rotor section 7 comprises a permanent magnet rotor body 13 and a polygonal mirror 15 connected thereto. The rotor body 13 is constructed as a flat cylindrical axially magnetized permanent magnet formed with a regular pattern of three axial holes 17 (see also FIG. 4). The rotor body 13 together with the mirror 15 is rotatable about an axis of rotation 19, the polygonal mirror 15 serving to direct and aim a beam issuing from a radiation source at a surface to be scanned optically. This surface may be formed on, for example, a strip-shaped or ribbon-shaped carrier. In order to achieve a high scanning speed (for example 60 m/s) at a low carrier speed (for example 0.6 cm/s) a very high speed of rotation of the polygonal mirror (for example $180.10^3$ rpm) is necessary. The scanning device in accordance with the invention is very suitable for rotating the polygonal mirror with such a speed.

The coils 9 of the stator section 5 are coils for generating electromagnetic driving forces acting on the rotor body 13 and are commutated electronically. The coils 9 are constructed as flat annular coils disposed in a plane which is oriented perpendicularly to the axis of rotation 19. The scanning device shown has four coils 9 which, when energized, cooperate with the rotor body 13 to rotate the rotor section 7. The coils 11 serve for generating electromagnetic bearing forces acting on the rotor body 13 for electromagnetically supporting the rotor section 7 relative to the stator section 5. The coils 11 are constructed as segmental coils, in particular arcuate banana-shaped segmental coils, and are arranged in four sets of two coils each. Viewed in the circumferential direction A of the rotor body 17 the sets are juxtaposed in a regular manner, the coils within the sets being disposed in line with one another viewed along the axis of rotation 19. The coils 11 for generating electromagnetic bearing forces are disposed in the magnet field of the rotor body 13 and, when suitably driven, they can exert such electromagnetic bearing forces on the rotor body 13 that the rotor section 7 is supported to float freely in the chamber 3. Upon energization of the coils 9 for generating electromagnetic driving forces the freely floating rotor section 7 thus obtained can be set into rotation about the axis of rotation 19 and this rotation can be sustained without mechanical contact being made with the stator section 5. In order to keep the rotor body 13 and the polygonal mirror 15 in a more or less centered position in the non-energized condition of the coils, a centering pin 10 which projects into an opening 8 in the rotor section 7 with ample clearance may be arranged in the housing. The device may comprise a stationary magnet in order to compensate for the force of gravity acting on the rotor section.

In order to guarantee a stable bearing arrangement and to provide the possibility of slightly translating and/or tilting the axis of rotation the scanning device in accordance with the invention comprises a position and orientation measurement system, briefly referred to as position measurement system, and a matrix circuit for selectively driving the coils so as to generate electromagnetic bearing forces acting on the rotor body.

Figure 5:
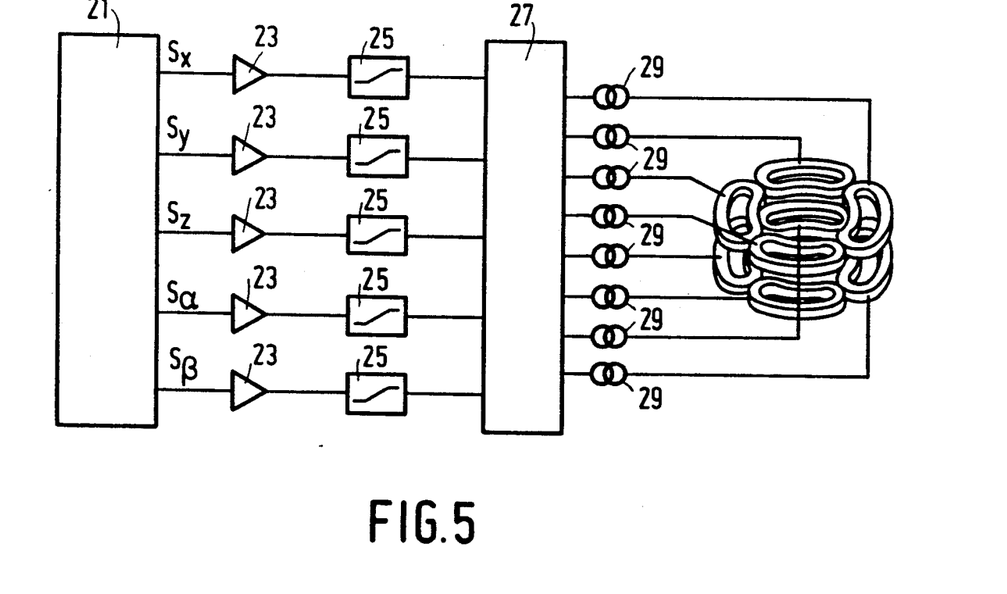
FIG. 5 is a circuit for use in the scanning device shown in FIG. 1.

FIG. 3 shows a system of orthogonal axes X, Y, Z whose origin O is assumed to be situated in the mass center of the polygonal mirror 15, so that the Z axis coincides with the axis of rotation 19. The six theoretically possible independent degrees of freedom of the rotor section 7, and hence of the mirror 15, comprise translations along the X-axis, Y-axis and Z-axis and rotations or pivotal movements about these axes. The translations along the X-axis, Y-axis and Z-axis and the pivotal movements about the X-axis and the Y-axis of the mirror 15 are of importance in relation to the coils 11 of the electromagnetic bearing arrangement. The rotation about the Z-axis is of importance with respect to the coils 9 of the rotary drive. The signals from a position measurement system 2 (FIG. 5) relate to the translations along the X-axis, Y-axis and Z-axis and the pivotal movements about the X-axis and the Y-axis, and in FIG. 5 they are indicated by Sx, Sy, Sz, Sα and Sβ respectively. The signals are applied to a matrix circuit 27 via amplifiers 23 and lead networks 25, in which circuit the signals are converted into suitable control signals. By means of eight current sources 29 the eight coils 11 are energized to generate the electromagnetic bearing forces acting on the rotor body 13.

The measurement system 21 comprises five detectors operating substantially independently of one another, in such a way that each position signal Sx, Sy, Sz, Sα and Sβ corresponds to one degree of freedom of the mirror 15. These five degrees of freedom comprise translations along the three axes (X-axis, Y-axis and Z-axis) and pivotal movements about the X-axis and the Y-axis of the system of orthogonal axes shown in FIG. 3. Said matrix circuit 27 is constructed in such a way that the signals applied thereto are transferred in such a manner that the electric current through the segmental coils 11 for generating electromagnetic bearing forces essentially produces a correction movement of the mirror 15 in accordance with the relevant degree of freedom without thereby causing any significant translation or pivotal movement of the mirror in accordance with one of the other degrees of freedom.

Figure 4:
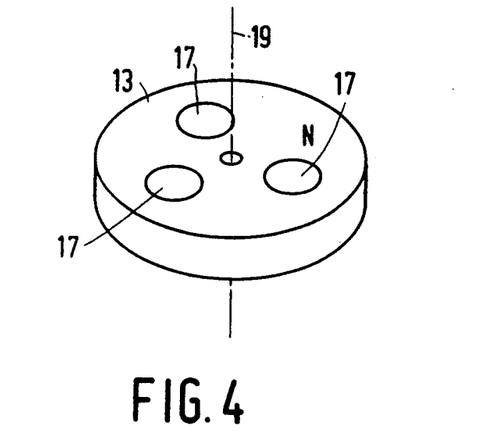
FIG. 4 is a perspective view of the rotor body of the drive unit in the scanning device shown in FIG. 1.
Figure 6:
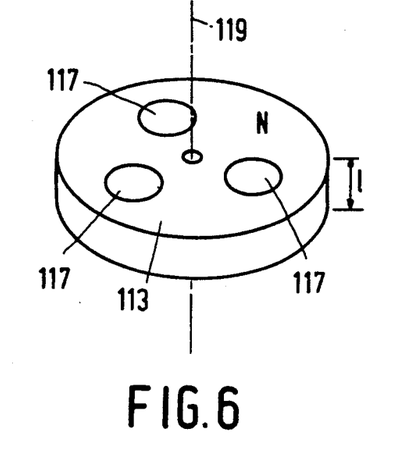
FIG. 6 is a perspective view showing a first modification of the rotor body shown in FIG. 4.

The rotor body 113 shown in FIG. 6 is a modification of the rotor body 13 shown in FIG. 4. The rotor body 113 is disc-shaped and, like the rotor body 13, it is made preferably of a high-grade permanent magnet material, such as neodymium iron-boron or samarium cobalt. The rotor body 113 is axially magnetized, in such a way that for example three magnetic portions 117 are formed having a direction of magnetization opposite to that of the remainder of the rotor body. The magnetic portions extend in axial directions over at least a part of the length 1 of the rotor body 113 and may be of circular or a polygonal cross-section. The magnetic portions 117 are situated in an annular zone whose center is situated on a central axis 119 of the rotor body 113 and they are arranged regularly relative to each other.

Figure 7:
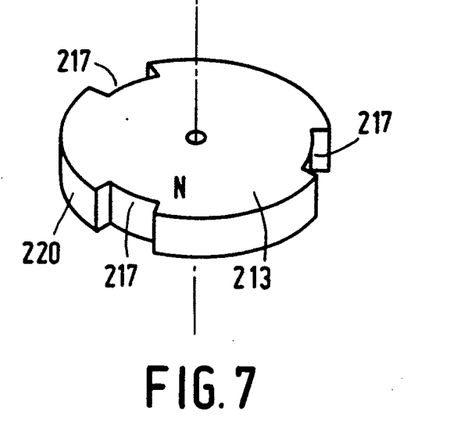
FIG. 7 shows a second modification of the rotor body.

The rotor body 213 shown in FIG. 7 is axially magnetized and comprises non-magnetic portions 217. The non-magnetic portions 217 are constituted by tangentially bounded axial slots formed in the circumferential surface 220. If desired, the slots may be filled with a non-magnetic material.

Figure 8:
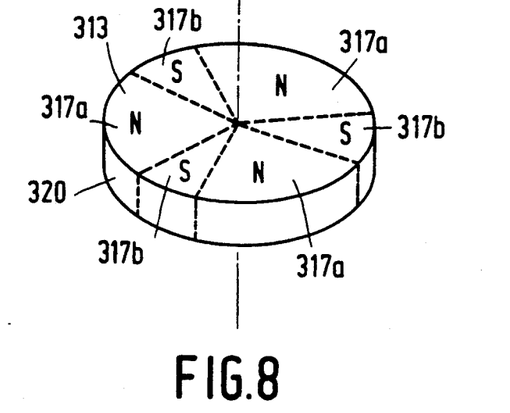
FIG. 8 shows a third modification.

FIG. 8 shows another modification of the rotor body 13. This rotor body, which is referenced 313, is axially magnetized and comprises first and second magnetic portions 317a and 317b respectively, which are magnetized oppositely relative to one another. The first and the second magnetic portions together constitute the circumferential surface 320 of the rotor body 313, the division into first magnetic portions 317a and second magnetic portions 317b being such that the part of the circumferential surface which, viewed in the circumferential direction of the rotor body, is formed by the first magnetic portions is not equal to the part formed by the second magnetic portions.

Figure 9A:
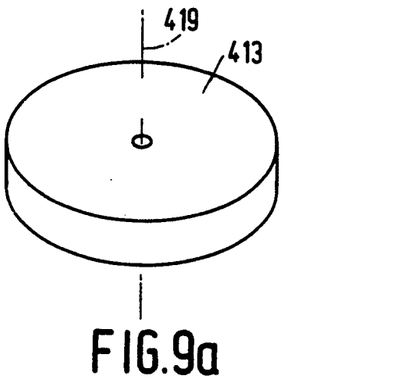
FIG. 9a and 9b show a fourth modification.
Figure 9B:
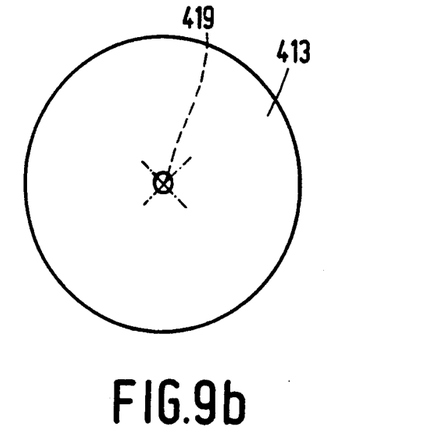

The rotor body 413 shown in FIGS. 9a and 9b is very suitable for use in an embodiment of the scanning device in accordance with the invention comprising combination coils, i.e., coils which can function both as coils for generating electromagnetic driving forces and coils for generating electromagnetic bearing forces. The rotor body 413, which is rotatable about an axis of rotation 419, is constructed as a disc-shaped magnet of elliptical cross-section oriented transversely of the axis of rotation 419. The rotor body 413 may comprise non-magnetic portions or deviating magnetic portions in a manner similar to the rotor body shown in FIGS. 4 and 6.

Figure 10:
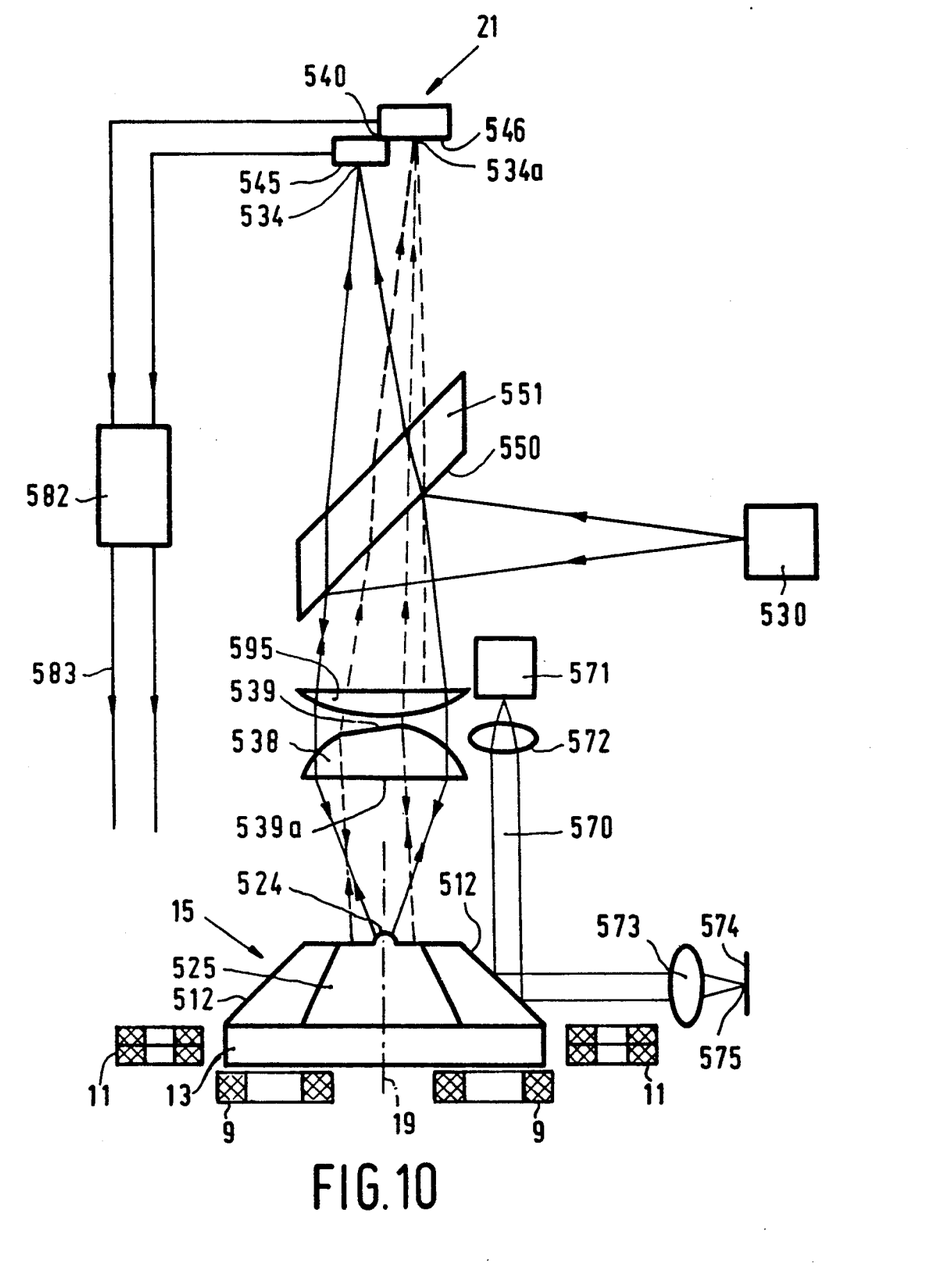
FIG. 10 shows a position measurement system for stabilizing the rotatable mirror during operation.

FIG. 10 shows an embodiment in which said measurement system comprising a position detection device is employed for stabilizing the rotating polygonal mirror 15. The device comprises a semiconductor laser 530 for generating the radiation beam, a semi-transparent mirror 550 for deflecting the radiation beam to the polygonal mirror 15, and a collimator lens 595. In the present embodiment a lens 538 for focusing the radiation beam on an arcuate mirror surface 524 on the polygonal mirror 15 is arranged between the semi-transparent mirror 550 and the mirror 15. The lens 538 has a flat central portion 539, which flat portion is inclined at a small angle relative to the corresponding surface 539a in the other refractive surface of the lens, so that this portion acts as an optical wedge. The lens 538 focuses the radiation which is incident on the peripheral refractive surface to a point which coincides with the center of the convex mirror surface 524. This radiation is reflected from the mirror surface 524 and is focused onto a detection system 540 via the lens 538, the collimator lens 595 and a plane-parallel plate 551. On the detection system 540 a radiation spot 534 is formed whose position and shape provide information about the position of the mirror surface 524 and hence of the polygonal mirror 15.

The parallel radiation beam which is incident on the flat central portion 539 of the lens 538 is not focused on the convex mirror surface 524 but is incident on a reflecting surface 525 of the polygonal mirror 15 surrounding said surface 524. Subsequently, this radiation is reflected, the direction of the reflected radiation depending on the orientation of the plane mirror surface 525 and hence of the polygonal mirror 15. The reflected beam again traverses the lenses 538 and 595 and the semi-transparent mirror 550 and forms a radiation spot 534a on the radiation-sensitive detection system 540. The position of this spot 534a is representative of the tilt of the mirror surface 525 and hence of the orientation of the polygonal mirror 15.

The radiation-sensitive detection system 540 comprises two quadrant detectors 545 and 546, which may each comprise four detectors, in particular radiation-sensitive diodes, by means of which both the position and the shape of the radiation spots 534 and 534a are determined. The position and orientation of the mirror surface 524 and hence of the polygonal mirror 15 can be derived from the position and shape of the radiation spots.

FIG. 10 illustrates a use of the device in accordance with the invention. The polygonal mirror 15, which is rotatable about the axis 19, comprises a plurality of facets, which are shown in the figure as surfaces 512 which are inclined at angles of 45° relative to the axis of rotation 15. A radiation beam 570 from a radiation source 571 is incident on the reflecting surfaces 512 of the polygonal mirror 15 and is deflected thereby depending on the position of the polygonal mirror. By means of a lens system 573, for example an f-8 lens, the beam is focused to form a scanning spot 575 on a surface 574 to be scanned. This surface, for example, forms part of an optical record carrier which is inscribed or read by means of the scanning beam 570. The record carrier is for example a disc-shaped or ribbon-shaped record carrier, which is inscribed with a multitude of parallel juxtaposed comparatively short tracks or strips. The direction of the tracks or strips is then determined by the combined movement of the record carrier 574 relative to the scanning device and the movement of the scanning spot 575 as a result of the rotation of the polygon. In order to enable information to be recorded on or read from the record carrier in this way at a sufficiently fast rate, for example for a HDTV program (High-Density Television) the polygonal mirror 15 should be rotated with a speed of a few thousands of revolutions per second. In order to achieve this the polygonal mirror, as already described hereinbefore, is secured to a permanent-magnetized body, referenced ×13 in FIG. 5, which is supported and driven by means of a suitable number of coils 9 and 11.

The radiation spots 534 and 534a formed on the detection system 540 via the reflecting surface 525 and the convex mirror surface 524 are converted into electric signals by means of the detectors, which signals provide information about the position and orientation of the polygon. The signals are analysed in a processing unit 582, which subsequently supplies output signals 583, which are applied to the coils 11 to influence the magnetic fields produced by the coils in order to stabilize the position and orientation of the rotating polygonal mirror. The processing unit 582 may comprise the afore-mentioned amplifiers 23, lead networks 25, the matrix circuit 27, and current sources 29.

For a comprehensive description of a device for optically determining the position and orientation of an object, in particular a rotatable polygonal mirror, reference is made to the Applicant's Netherlands Patent Application 9001253, to which U.S. patent application Ser. No. 07/581,828 corresponds, filed simultaneously with the present Application.

It is to be noted that the invention is not limited to the embodiments shown herein. For example, the scanning device in accordance with the invention may comprise more than or less than four sets of segmental coils for generating electromagnetic bearing forces. Moreover, the number of segmental coils in each set may differ from two. In addition, segmental coils of another shape than shown are possible.

I claim:

1. A scanning device comprising a rotatable mirror for directing and aiming a radiation beam at a surface to be scanned, and a drive unit comprising a rotor section carrying the mirror and supported so as to be rotatable about an axis of rotation, which rotor section comprises a cylindrical, at least partly permanent-magnetic rotor body and a stationary stator section with coils extending into the magnet field of the rotor body, for generating electromagnetic driving forces acting on the rotor body to provide the rotary drive of the rotor section, characterized in that the stator section of the drive unit comprises coils disposed in said magnet field of the rotor body, for generating electromagnetic bearing forces acting on the rotor body to support the rotatable rotor section electromagnetically relative to the stator section.

2. A scanning device as claimed in claim 1, characterized in that the scanning device comprises a position and orientation measurement system comprising at least one detector for measuring the position and orientation of the mirror and for generating signals, a matrix circuit being provided for selectively driving the coils for generating electromagnetic bearing forces depending upon said signals.

3. A scanning device as claimed in claim 1, characterized in that the coils for generating electromagnetic bearing forces are segmental coils and are arranged in sets of segmental coils which are juxtaposed viewed in the circumferential direction in the rotor body, the sets of segmental coils each comprising at least two segmental coils which are arranged in line viewed along the axis of rotation of the rotor section.

4. A scanning device as claimed in claim 3, characterized in that the number of sets of segmental coils is at least four.

5. A scanning device as claimed in claim 1, characterized in that the rotor section of the drive unit is supported exclusively electromagnetically.

6. A scanning device as claimed in claim 1, in which the rotor body at least partly exhibits an axial permanent magnetization and in which the coils for generating electromagnetic driving forces being disposed in a plane which is oriented transversely of the axis of rotation of the rotor section of the drive unit, characterized in that the rotor body comprises non-magnetic portions, or magnetic portions having a direction of magnetization opposite to that of the remainder of the rotor body, which portions are situated opposite the coils for generating electromagnetic driving forces, which portions are spaced at a radial distance from the circumferential surface of the rotor body, and which portions are tangentially bounded and extend axially in the rotor body.

7. A scanning device as claimed in claim 6, characterized in that the non-magnetic portions are formed by regularly spaced holes which extend axially in the rotor body.

8. A scanning device as claimed in claim 1, in which the rotor body at least partly exhibits an axial permanent magnetization, and in which the coils for generating electromagnetic driving forces are disposed in a plane which is oriented transversely of the axis of rotation of the rotor section of the drive unit, characterized in that the rotor body comprises non-magnetic portions situated opposite the coils for generating electromagnetic driving forces and adjoining the circumferential surface of the rotor body, which portions are bounded in a tangential direction and extend axially in the rotor body.

9. A scanning device as claimed in claim 1, in which the coils for generating electromagnetic driving forces are disposed in a plane which is oriented transversely of the axis of rotation of the rotor section of the drive unit, and in which the rotor body comprises first and second magnetic portions having opposite directions of magnetization, which portions are situated opposite the coils for generating electromagnetic driving forces, which adjoin the circumferential surface of the rotor body, which are bounded in the tangential direction and which extend axially in the rotor body, the first magnetic portions together forming a first part of the circumferential length of the circumferential surface and the second magnetic portions together forming a second part of the circumferential length of the circumferential surface of the rotor body, characterized in that the first part of the circumferential length is unequal to the second part of the circumferential length of the circumferential surface of the rotor body.

10. A scanning device as claimed in claim 1, characterized in that the rotor body is manufactured from one piece of a material.

11. A scanning device as claimed in claim 1, characterized in that at least a number of the coils are constructed as combination coils which function both as coils for generating electromagnetic driving forces and as coils for generating electromagnetic bearing forces.

12. A scanning device as claimed in claim 1, characterized in that there is provided an evacuated chamber in which at least the mirror and the mirror-carrying rotor section of the drive unit are arranged.

13. A drive unit for use in a scanning device as claimed in claim 1.

14. A rotor body for use in the drive unit of the scanning device as claimed in claim 6.

15. A scanning device as claimed in claim 2, characterized in that the coils for generating electromagnetic bearing forces are segmental coils and are arranged in sets of segmental coils which are juxtaposed viewed in the circumferential direction in the rotor body, the sets of segmental coils each comprising at least two segmental coils which are arranged in line viewed along the axis of rotation of the rotor section.

16. A scanning device as claimed in claim 2, characterized in that the rotor section of the drive unit is supported exclusively electromagnetically.

17. A scanning device as claimed in claim 16, in which the rotor body at least partly exhibits an axial permanent magnetization and in which the coils for generating electromagnetic driving forces being disposed in a plane which is oriented transversely of the axis of rotation of the rotor section of the drive unit, characterized in that the rotor body comprises non-magnetic portions, or magnetic portions having a direction of magnetization opposite to that of the remainder of the rotor body, which portions are situated opposite the coils for generating electromagnetic driving forces, which portions are spaced at a radial distance from the circumferential surface of the rotor body, and which portions are tangentially bounded and extend axially in the rotor body.

18. A scanning device as claimed in claim 3, in which the rotor body at least partly exhibits an axial permanent magnetization and in which the coils for generating electromagnetic driving forces being disposed in a plane which is oriented transversely of the axis of rotation of the rotor section of the drive unit, characterized in that the rotor body comprises non-magnetic portions, or magnetic portions having a direction of magnetization opposite to that of the remainder of the rotor body, which portions are situated opposite the coils for generating electromagnetic driving forces, which portions are spaced at a radial distance from the circumferential surface of the rotor body, and which portions are tangentially bounded and extend axially in the rotor body.

19. A scanning device as claimed in claim 5, in which the rotor body at least partly exhibits an axial permanent magnetization, and in which the coils for generating electromagnetic driving forces are disposed in a plane which is oriented transversely of the axis of rotation of the rotor section of the drive unit, characterized in that the rotor body comprises non-magnetic portions situated opposite the coils for generating electromagnetic driving forces and adjoining the circumferential surface of the rotor body, which portions are bounded in a tangential direction and extend axially in the rotor body.

20. A scanning device as claimed in claim 2, in which the rotor body at least partly exhibits an axial permanent magnetization, and in which the coils for generating electromagnetic driving forces are disposed in a plane which is oriented transversely of the axis of rotation of the rotor section of the drive unit, characterized in that the rotor body comprises non-magnetic portions situated opposite the coils for generating electromagnetic driving forces and adjoining the circumferential surface of the rotor body, which portions are bounded in a tangential direction and extend axially in the rotor body.

* * * * *